United States Patent
Dindi

(10) Patent No.: US 10,669,490 B2
(45) Date of Patent: Jun. 2, 2020

(54) PROCESS FOR PRODUCING DIESEL WITH LOW LEVELS OF SULFUR

(71) Applicant: DUPONT INDUSTRIAL BIOSCIENCES USA, LLC, Wilmington, DE (US)

(72) Inventor: Hasan Dindi, Wilmington, DE (US)

(73) Assignee: DuPont Industrial Biosciences USA, LLC, Wilmington, DE (US)

( * ) Notice: Subject to any disclaimer, the term of this patent is extended or adjusted under 35 U.S.C. 154(b) by 336 days.

(21) Appl. No.: 15/401,400

(22) Filed: Jan. 9, 2017

(65) Prior Publication Data

US 2017/0211000 A1    Jul. 27, 2017

Related U.S. Application Data

(60) Provisional application No. 62/286,562, filed on Jan. 25, 2016.

(51) Int. Cl.
| | | |
|---|---|---|
| *C10G 45/08* | (2006.01) | |
| *C10G 67/02* | (2006.01) | |
| *C10L 1/08* | (2006.01) | |
| *C10G 45/22* | (2006.01) | |
| *C10G 65/04* | (2006.01) | |

(52) U.S. Cl.
CPC ............ *C10G 45/08* (2013.01); *C10G 45/22* (2013.01); *C10G 65/04* (2013.01); *C10G 67/02* (2013.01); *C10L 1/08* (2013.01); *C10G 2300/202* (2013.01); *C10G 2300/207* (2013.01); *C10G 2400/04* (2013.01); *C10G 2400/08* (2013.01)

(58) Field of Classification Search
CPC .. C10G 45/08; C10G 67/02; C10G 2300/202; C10G 2300/207; C10G 2400/04
See application file for complete search history.

(56) References Cited

U.S. PATENT DOCUMENTS

| 4,431,522 A | 2/1984 | James, Jr. | |
|---|---|---|---|
| 4,990,242 A * | 2/1991 | Louie ................... | C10G 65/16 208/211 |
| 6,123,835 A | 9/2000 | Ackerson et al. | |
| 2006/0144756 A1 | 7/2006 | Ackerson et al. | |
| 2008/0083651 A1 | 4/2008 | Abhari et al. | |
| 2013/0313161 A1* | 11/2013 | Dindi ................... | C10G 65/02 208/57 |
| 2013/0324775 A1 | 12/2013 | Quignard et al. | |

FOREIGN PATENT DOCUMENTS

EP    2631282 B1    4/2015

OTHER PUBLICATIONS

Osipov, L.N. et al., Hydrorefining of Diesel Fuels, Tr. Vses. Nauch. Issled. Inst. P, Pererabotke Nefti I Gaza I Polucheniyu Iskusstv Zhidkogo Topliva (1959), (8), 54-73, From: Ref. Zh., Khim, 1963, Abstr. No. 2P128. Abstract Only, pp. 1-2.

* cited by examiner

*Primary Examiner* — Prem C Singh
*Assistant Examiner* — Brandi M Doyle
(74) *Attorney, Agent, or Firm* — Stinson LLP

(57) ABSTRACT

This disclosure relates to a process for producing diesel with reduced levels of sulfur. The process involves (a) providing a diesel feed comprising a diesel having a sulfur content in the range of about 20 to about 10,000 wppm; (b) feeding the diesel feed and a hydrogen rich gas to a reaction zone comprising a hydrotreating catalyst to produce a hydrotreated diesel effluent comprising diesel and hydrogen sulfide; and (c) removing hydrogen sulfide from the hydrotreated diesel effluent to produce a diesel product having a sulfur content no more than about 100 wppm; wherein hydrogen consumption in the reaction zone is in the range of about −150 to about 150 scf/bbl.

22 Claims, No Drawings

PROCESS FOR PRODUCING DIESEL WITH LOW LEVELS OF SULFUR

CROSS-REFERENCE TO RELATED APPLICATION

This application claims priority of U.S. Patent Application 62/286,562 filed on Jan. 25, 2016.

BACKGROUND

Field of the Disclosure

The present disclosure relates to a hydrotreating process to reduce the levels of contaminants in a contaminated diesel product. More specifically, the present disclosure relates to a hydrotreating process to remove sulfur from a diesel feed stream to produce ultra-low-sulfur-diesel (ULSD).

Description of Related Art

Global demand for diesel has risen quickly with increased growth of transportation fuels. At the same time, regulations on the properties of the transportation diesel have been established to substantially lower the sulfur levels in diesel fuels in order to reduce sulfur dioxide ($SO_2$) emissions from use of such fuels. There are other pending rules calling to reduce the sulfur content in off-road diesel as well. European standards, for example, call for a sulfur content of less than 10 part per million by weight (wppm) which is often referred to as ultra-low-sulfur-diesel, or ULSD.

Hydrotreating processes, such as hydrodesulfurization (HDS) and hydrodenitrogenation (HDN), which remove sulfur and nitrogen, respectively, have been used to treat hydrocarbon feeds to produce clean fuels. The processes can be conducted in various hydroprocessing units, such as three-phase hydroprocessing reactors or two-phase hydroprocessing reactors.

In a three-phase hydroprocessing reactor, commonly known as a trickle bed reactor, three phases (gas, liquid and solid) are present. The continuous phase through the reactor is the gas phase which is largely hydrogen. Therefore, a trickle bed reactor typically requires use of a large excess of hydrogen relative to the feed in order to form the continuous gaseous phase and effectively transfer hydrogen from the gaseous phase through a liquid-phase hydrocarbon feed to react with the feed at the surface of a solid catalyst. Excess hydrogen is recycled through a hydrogen recycle compressor to avoid loss of the hydrogen value.

Ackerson et al. in U.S. Pat. No. 6,123,835, disclose a two-phase hydroprocessing system which eliminates the need to transfer hydrogen from the vapor phase through a liquid phase hydrocarbon to the surface of a solid catalyst. In the two-phase hydroprocessing system, continuous phase through the reactor is the liquid phase, and a solvent, which may be a recycled portion of hydroprocessed liquid effluent, acts as diluent and is mixed with a hydrocarbon feed. Hydrogen is dissolved in the feed/diluent mixture to provide hydrogen in the liquid phase. Substantially all of the hydrogen required in the hydroprocessing reaction is available in solution.

BRIEF SUMMARY OF THE DISCLOSURE

The present disclosure provides a process for producing diesel with reduced levels of sulfur. The process comprises: (a) providing a diesel feed comprising a diesel having a sulfur content in the range of about 20 to about 10,000 wppm; (b) feeding the diesel feed and a hydrogen rich gas to a reaction zone comprising a hydrotreating catalyst to produce a hydrotreated diesel effluent comprising diesel and hydrogen sulfide; and (c) removing hydrogen sulfide from the hydrotreated diesel effluent to produce a diesel product having a sulfur content no more than about 100 wppm; wherein hydrogen consumption in the reaction zone is in the range of about −150 to about 150 scf/bbl.

The present disclosure also provides a liquid-full process for producing diesel with reduced levels of sulfur. The process comprises: (a) providing a diesel feed comprising a diesel having a sulfur content in the range of about 20 to about 10,000 wppm; (b) contacting the diesel feed with (i) a diluent and (ii) a hydrogen rich gas to form a feed/diluent/hydrogen mixture, wherein the hydrogen is dissolved in the mixture to provide a liquid feed; (c) contacting the feed/diluent/hydrogen mixture with a hydrotreating catalyst in a liquid-full reaction zone to produce a hydrotreated diesel effluent comprising diesel and hydrogen sulfide; (d) optionally recycling a portion of the hydrotreated diesel effluent as a hydrocarbon recycle stream for use as all or part of the diluent in step (b)(i) at a recycle ratio of no more than about 10; and (e) removing hydrogen sulfide from at least a portion of the hydrotreated diesel effluent not recycled to produce a diesel product having a sulfur content no more than about 100 wppm; wherein hydrogen consumption in the reaction zone is in the range of about −150 to about 150 scf/bbl.

The present disclosure also provides another liquid-full process for producing diesel with reduced levels of sulfur. The process comprises: (a) providing a diesel feed comprising a diesel having a sulfur content in the range of about 20 to about 10,000 wppm; (b) contacting the diesel feed with a hydrogen rich gas to form a feed/hydrogen mixture, wherein the hydrogen is dissolved in the mixture to provide a liquid feed, and the mixture is not diluted with a diluent; (c) contacting the feed/hydrogen mixture with a hydrotreating catalyst in a liquid-full reaction zone to produce a hydrotreated diesel effluent comprising diesel and hydrogen sulfide; and (d) removing hydrogen sulfide from the hydrotreated diesel effluent to produce a diesel product having a sulfur content no more than about 100 wppm; wherein hydrogen consumption in the reaction zone is in the range of about −150 to about 150 scf/bbl.

It was found through experiments that the processes of this disclosure can effectively reduce the levels of sulfur in the contaminated diesel under mild reaction conditions to satisfy the regulation requirements with minimal or no hydrogen consumption.

DETAILED DESCRIPTION

The foregoing general description and the following detailed description are exemplary and explanatory only and are not restrictive of the invention, as defined in the appended claims. Other features and benefits of any one or more of the embodiments will be apparent from the following detailed description, and from the claims.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. In case of conflict, the present specification, including definitions, will control. Although methods and materials similar or equivalent to those described herein can be used in the practice or testing of embodiments of the present invention, suitable methods and materials are described below. In addition, the materials, methods, and examples are illustrative only and not intended to be limiting.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

Before addressing details of embodiments described below, some terms are defined or clarified.

The term, "hydrogen consumption in the reaction zone", as used herein, means the total net chemical hydrogen consumption in the reaction zone. It is the net hydrogen amount change in the reaction zone for producing the hydrotreated diesel effluent. It can be measured through the difference of the hydrogen amount fed to the reaction zone and the hydrogen amount exiting the reaction zone. The hydrogen consumption value can become negative when the process generates more hydrogen than being consumed during the process. A negative hydrogen consumption means the hydrogen amount exiting the reaction zone is more than the hydrogen amount fed to the reaction zone. Not wishing to be bound by any theory, it is believed that during the hydrotreating process, some naphthenes are converted to aromatics, thereby generating hydrogen.

The terms "three-phase reaction zone" and "trickle bed reaction zone", as used herein, are interchangeable and mean a reaction zone in which both liquid and gas streams pass through a packed bed of solid catalyst particles, and the gas phase is the continuous phase.

The term, "LHSV", as used herein, means liquid hourly space velocity, which is the volumetric rate of the fresh diesel feed divided by the volume of the catalyst, and is given in $hr^{-1}$.

The term "an elevated temperature", as used herein, means a temperature higher than the room temperature.

The term "polyaromatic(s)", as used herein, means polycyclic aromatic hydrocarbons and includes molecules with nucleus of two or more fused aromatic ring such as, for example, naphthalene, anthracene, phenanthracene and so forth, and derivatives thereof.

The terms "diesel" and "diesel product", as used herein, mean the distillate volume fraction from about 150° C. to about 380° C. as determined using ASTM D86.

The term "yield of the diesel product", as used herein, means the weight percentage of the desired diesel product generated in the process compared to the weight of the diesel feed.

The term "naphtha", as used herein, means the distillate volume fraction from about 30° C. to about 150° C. as determined using ASTM D86.

The term "naphtha yield", as used herein, means the weight percentage of naphtha contained in the hydrotreated diesel effluent.

The term "hydroprocessing", as used herein, means a process that is carried out in the presence of hydrogen, including, but not limited to, hydrogenation, hydrotreating, hydrocracking, dewaxing, hydroisomerization, and hydrodearomatization.

The term "hydrotreating", as used herein, means a process in which a hydrocarbon feed reacts with hydrogen, in the presence of a hydrotreating catalyst, to hydrogenate olefins and/or aromatics or remove heteroatoms such as sulfur (hydrodesulfurization), nitrogen (hydrodenitrogenation, also referred to as hydrodenitrification), oxygen (hydrodeoxygenation), metals (hydrodemetallation), asphaltenes, and combinations thereof.

Nowadays, many petroleum products such as diesel, jet fuel and gasoline are transported through pipelines. During the operation, diesel can be contaminated by other petroleum products such as a jet fuel with relatively high sulfur content. As a result, the sulfur content in the diesel may rise above the regulation limit, making it a low value product. Since pipeline operation companies typically have limited resources of hydrogen, it remains desirable to provide an efficient process to reduce the levels of sulfur in the contaminated diesel to satisfy the regulation requirements with minimal or no hydrogen consumption.

Diesel Feed

The diesel feed used in the processes of this disclosure comprises, consists essentially of, or consists of a contaminated diesel. The contaminated diesel typically has a sulfur content in the range of about 20 to about 10,000 wppm. In some embodiments, the contaminated diesel has a sulfur content in the range of about 50 to about 2,000 wppm, or in the range of about 50 to about 1,000 wppm, or in the range of about 100 to about 700 wppm, or in the range of about 100 to about 500 wppm, or in the range of about 150 to about 500 wppm, or in the range of about 200 to about 400 wppm.

The contaminated diesel typically has a nitrogen content in the range of about 1 to about 500 wppm. In some embodiments, the contaminated diesel has a nitrogen content in the range of about 1 to about 300 wppm, or in the range of about 5 to about 300 wppm, or in the range of about 5 to about 100 wppm, or in the range of about 5 to about 50 wppm, or in the range of about 5 to about 20 wppm.

The contaminated diesel typically has a monoaromatic content in the range of about 10 to about 50 wt %. In some embodiments, the contaminated diesel has a monoaromatic content in the range of about 15 to about 45 wt %, or in the range of about 15 to about 35 wt %, or in the range of about 20 to about 35 wt %, or in the range of about 25 to about 30 wt %.

The contaminated diesel typically has a polyaromatic content in the range of about 0.5 to about 20 wt %. In some embodiments, the contaminated diesel has a polyaromatic content in the range of about 1 to about 10 wt %, or in the range of about 1 to about 7 wt %, or in the range of about 1 to about 5 wt %, or in the range of about 2 to about 5 wt %, or in the range of about 3 to about 5 wt %.

The contaminated diesel typically has a density in the range of about 0.7 to about 0.95 g/ml at 15.6° C. In some embodiments, the contaminated diesel has a density in the range of about 0.75 to about 0.85 g/ml at 15.6° C., or in the range of about 0.80 to about 0.90 g/ml at 15.6° C., or in the range of about 0.80 to about 0.85 g/ml at 15.6° C., or in the range of about 0.82 to about 0.85 g/ml at 15.6° C., or in the range of about 0.83 to about 0.84 g/ml at 15.6° C.

The contaminated diesel typically has a cetane index value in the range of about 15 to about 60. In some embodiments, the contaminated diesel has a cetane index value in the range of about 30 to about 60, or in the range of about 30 to about 55, or in the range of about 35 to about 55, or in the range of about 40 to about 50, or in the range of about 42 to about 48.

The diesel feed typically comprises more than 30 wt % of the contaminated diesel. In some embodiments, the diesel feed comprises more than 50 wt % of the contaminated diesel, or more than 80 wt % of the contaminated diesel, or more than 85 wt % of the contaminated diesel, or more than 90 wt % of the contaminated diesel, or more than 95 wt % of the contaminated diesel, or more than 98 wt % of the contaminated diesel. In some embodiments, the diesel feed consists essentially of the contaminated diesel.

Hydrogen Rich Gas

The hydrogen rich gas of this disclosure comprises, consists essentially of, or consists of a hydrogen gas. The hydrogen rich gas may also comprises other kind of gases such as nitrogen, hydrogen sulfide ($H_2S$), ammonia ($NH_3$), and C1 to C4 hydrocarbons. In some embodiments, the hydrogen rich gas comprises at least 70 mole %, or at least 75 mole %, or at least 80 mole %, or at least 85 mole %, or at least 90 mole %, or at least 95 mole %, or at least 98 mole % of hydrogen gas.

Hydrotreating Catalyst

The hydrotreating catalyst used in the processes of this disclosure can be any suitable hydrotreating catalyst that results in reducing the sulfur content of the contaminated diesel in the diesel feed under the reaction conditions in the reaction zone. In some embodiments of this invention, the suitable hydrotreating catalyst comprises, consists essentially of, or consists of a non-precious metal and an oxide support. In some embodiments, the metal is nickel or cobalt, or combinations thereof, preferably combined with molybdenum and/or tungsten. In some embodiments, the metal is selected from the group consisting of nickel-molybdenum (NiMo), cobalt-molybdenum (CoMo), nickel-tungsten (NiW), cobalt-tungsten (CoW) and cobalt-nickel-molybdenum (CoNiMo). In some embodiments, the metal is selected from the group consisting of cobalt-molybdenum (CoMo), nickel-molybdenum (NiMo) and cobalt-nickel-molybdenum (CoNiMo). In some embodiments, the metal is cobalt-molybdenum (CoMo). The catalyst oxide support is a mono- or mixed-metal oxide. In some embodiments, the oxide support is selected from the group consisting of alumina, silica, titania, zirconia, kieselguhr, silica-alumina, and combinations of two or more thereof. In some embodiments, the oxide support comprises, consists essentially of, or consists of an alumina.

In some embodiments, the hydrotreating catalyst consists essentially of cobalt-molybdenum (CoMo) loaded on an alumina support, or nickel-molybdenum (NiMo) loaded on an alumina support, or cobalt-nickel-molybdenum (CoNiMo) loaded on an alumina support. In some embodiments, the hydrotreating catalyst consists essentially of cobalt-molybdenum (CoMo) loaded on an alumina support.

In some embodiments of this invention, the hydrotreating catalyst is in the form of particles, preferably shaped particles. By "shaped particle" it is meant the catalyst is in the form of an extrudate. Extrudates include cylinders, pellets, or spheres. Cylinder shapes may have hollow interiors with one or more reinforcing ribs. Trilobe, quadralobe, cloverleaf, rectangular- and triangular-shaped tubes, cross, and "C"-shaped catalysts can be used. In some embodiments, a shaped catalyst particle is about 0.25 to about 13 mm (about 0.01 to about 0.5 inch) in diameter, and preferably about 1 to about 2 mm in diameter, when a packed bed reactor is used. In some embodiments, a shaped catalyst particle is about 0.79 to about 6.4 mm (about 1/32 to about 1/4 inch) in diameter. Such catalysts may be commercially available.

The hydrotreating catalyst may be sulfided before and/or during use by contacting the catalyst with a sulfur-containing compound at an elevated temperature. Suitable sulfur-containing compound include thiols, sulfides, disulfides, $H_2S$, or combinations of two or more thereof. The hydrotreating catalyst may be sulfided before use ("pre-sulfiding") or during the process ("sulfiding") by introducing a small amount of a sulfur-containing compound in the feed or diluent. The catalysts may be pre-sulfided in situ or ex situ and the feed or diluent may be supplemented periodically with added sulfur-containing compound to maintain the catalysts in sulfided condition. The Examples provide a pre-sulfiding procedure.

Hydrotreated Diesel Effluent

The hydrotreated diesel effluent produced in the reaction zone typically has a sulfur content no more than about 300 wppm. In some embodiments, the hydrotreated diesel effluent has a sulfur content no more than about 100 wppm, or no more than about 50 wppm, or no more than about 20 wppm, or no more than about 10 wppm.

The hydrotreated diesel effluent produced in the reaction zone typically has a nitrogen content no more than about 100 wppm. In some embodiments, the hydrotreated diesel effluent has a nitrogen content no more than about 50 wppm, or no more than about 30 wppm, or no more than about 20 wppm, or no more than about 10 wppm.

The hydrotreated diesel effluent produced in the reaction zone typically has a monoaromatic content in the range of about 10 to about 50 wt %. In some embodiments, the hydrotreated diesel effluent has a monoaromatic content in the range of about 15 to about 45 wt %, or in the range of about 15 to about 35 wt %, or in the range of about 20 to about 35 wt %, or in the range of about 24 to about 31 wt %.

The hydrotreated diesel effluent produced in the reaction zone typically has a polyaromatic content in the range of about 0.5 to about 20 wt %. In some embodiments, the hydrotreated diesel effluent has a polyaromatic content in the range of about 1 to about 15 wt %, or in the range of about 1 to about 10 wt %, or in the range of about 1 to about 8 wt %, or in the range of about 2 to about 7 wt %, or in the range of about 2 to about 6 wt %.

The hydrotreated diesel effluent produced in the reaction zone typically has a density in the range of about 0.7 to about 0.95 g/ml at 15.6° C. In some embodiments, the hydrotreated diesel effluent has a density in the range of about 0.75 to about 0.85 g/ml at 15.6° C., or in the range of about 0.78 to about 0.88 g/ml at 15.6° C., or in the range of about 0.80 to about 0.85 g/ml at 15.6° C., or in the range of about 0.81 to about 0.84 g/ml at 15.6° C.

The hydrotreated diesel effluent produced in the reaction zone typically has a cetane index value in the range of about 15 to about 60. In some embodiments, the hydrotreated diesel effluent has a cetane index value in the range of about 30 to about 60, or in the range of about 30 to about 55, or in the range of about 35 to about 55, or in the range of about 40 to about 50, or in the range of about 42 to about 48.

Diesel Product

The diesel product produced in the processes of this disclosure can be used as a diesel fuel blend stock. The diesel product typically has a sulfur content no more than about 300 wppm. In some embodiments, the diesel product has a sulfur content no more than about 100 wppm, or no more than about 50 wppm, or no more than about 20 wppm, or no more than about 10 wppm.

The diesel product typically has a nitrogen content no more than about 100 wppm. In some embodiments, the diesel product has a nitrogen content no more than about 50 wppm, or no more than about 30 wppm, or no more than about 20 wppm, or no more than about 10 wppm.

The diesel product typically has a monoaromatic content in the range of about 10 to about 50 wt %. In some embodiments, the diesel product has a monoaromatic content in the range of about 15 to about 45 wt %, or in the range of about 15 to about 35 wt %, or in the range of about 20 to about 35 wt %, or in the range of about 24 to about 31 wt %.

The diesel product typically has a polyaromatic content in the range of about 0.5 to about 20 wt %. In some embodiments, the diesel product has a polyaromatic content in the range of about 1 to about 15 wt %, or in the range of about 1 to about 10 wt %, or in the range of about 1 to about 8 wt %, or in the range of about 2 to about 7 wt %, or in the range of about 3 to about 6 wt %.

The diesel product typically has a density in the range of about 0.7 to about 0.95 g/ml at 15.6° C. In some embodiments, the diesel product has a density in the range of about 0.75 to about 0.85 g/ml at 15.6° C., or in the range of about 0.78 to about 0.88 g/ml at 15.6° C., or in the range of about 0.80 to about 0.85 g/ml at 15.6° C., or in the range of about 0.81 to about 0.85 g/ml at 15.6° C., or in the range of about 0.82 to about 0.84 g/ml at 15.6° C.

The diesel product typically has a cetane index value in the range of about 15 to about 60. In some embodiments, the diesel product has a cetane index value in the range of about 30 to about 60, or in the range of about 30 to about 55, or in the range of about 35 to about 55, or in the range of about 40 to about 50, or in the range of about 42 to about 48.

The present disclosure provides a process for producing diesel with reduced levels of sulfur. The process comprises: (a) providing a diesel feed comprising a diesel having a sulfur content in the range of about 20 to about 10,000 wppm; (b) feeding the diesel feed and a hydrogen rich gas to a reaction zone comprising a hydrotreating catalyst to produce a hydrotreated diesel effluent comprising diesel and hydrogen sulfide; and (c) removing hydrogen sulfide from the hydrotreated diesel effluent to produce a diesel product having a sulfur content no more than about 100 wppm; wherein hydrogen consumption in the reaction zone is in the range of about −150 to about 150 scf/bbl.

The hydrotreating reactions of this disclosure can take place in various kinds of reaction zones known in the art, for example, a reaction zone comprising an ebullated catalyst bed, a three-phase reaction zone, or a liquid-full reaction zone.

The hydrogen rich gas is fed in an amount sufficient to maintain an effective reaction condition for conducting a hydrotreating process to reduce the sulfur content in the diesel feed. In some embodiments of this invention, at least a portion of the hydrogen rich gas and the diesel feed are combined or admixed and co-fed to the reaction zone. In some embodiments, the diesel feed and the hydrogen rich gas are fed to the reaction zone separately.

Typically, the reaction zone has a temperature from about 260° C. to about 382° C., and in some embodiments from about 282° C. to about 371° C. Typically, the reaction zone has a pressure from about 100 to about 1300 psig, in some embodiments from about 300 to about 1000 psig, and in some embodiments from about 300 to about 700 psig.

Typically, hydrogen consumption in the reaction zone is in the range of about −150 to about 150 scf/bbl. In some embodiments, the hydrogen consumption in the reaction zone is in the range of about −100 to about 100 scf/bbl, or in the range of about −80 to about 80 scf/bbl, or in the range of about −50 to about 100 scf/bbl, or in the range of about −50 to about 80 scf/bbl, or in the range of about −30 to about 80 scf/bbl, or in the range of about −10 to about 70 scf/bbl, or in the range of about 0 to about 60 scf/bbl, or in the range of about 5 to about 50 scf/bbl.

Essentially no naphtha is produced in the reaction zone. Typically, the naphtha yield is no more than about 5 wt %. In some embodiments, the naphtha yield is no more than about 4 wt %, 3 wt %, 2 wt %, 1 wt %, 0.5 wt %, or 0.2 wt %.

The hydrotreated diesel effluent produced in the reaction zone typically comprises diesel and hydrogen sulfide. It may also comprises hydrogen and in some embodiments further comprises ammonia, and/or C1 to C4 hydrocarbons.

The hydrotreated diesel effluent from the reaction zone may be directed to a separation zone to remove hydrogen sulfide from the hydrotreated diesel effluent to produce a desired diesel product and in some embodiments generate a hydrogen recycle gas stream. In some embodiments, the separation zone comprises a flash vessel, or a stripping vessel, or combinations thereof. In some embodiments, the separation zone comprises a stripping vessel. In some embodiments, there is no fractionating column in the separation zone.

The stripping vessel uses a stripping gas to remove gaseous compounds such as hydrogen sulfide from the hydrotreated diesel effluent. In some embodiments, the stripping gas comprises, consists essentially of, or consists of a nitrogen gas. In some embodiments, the stripping gas comprises at least 75%, 80%, 85%, 90%, 95%, or 98% of nitrogen by volume.

The separation zone separates or removes vapor materials from the hydrotreated diesel effluent to form a gas effluent and a liquid effluent. The gas effluent comprises hydrogen and hydrogen sulfide. In some embodiments, the gas effluent further comprises ammonia, and/or C1 to C4 hydrocarbons and the like. The liquid effluent comprises, consists essentially of, or consists of the diesel product.

The yield of the diesel product typically is at least about 80 wt %. In some embodiments, the yield of the diesel product is at least about 85 wt %, 90 wt %, 95 wt or 98 wt %.

In some embodiments of this invention, the hydrotreating reaction is conducted in a three-phase reaction zone, and the diesel feed and the hydrogen rich gas are fed to a three-phase reaction zone comprising a hydrotreating catalyst.

The three-phase reaction zone may comprise one or more hydrotreating catalyst beds disposed in one or more trickle bed reactors. Each trickle bed reactor may independently comprise one or more hydrotreating catalyst beds. In some embodiments of this invention, the three-phase hydrotreating process is conducted in a single trickle bed reactor. In such embodiments, the diesel feed and the hydrogen rich gas are fed to a single trickle bed reactor containing one or more hydrotreating catalyst beds.

The hydrogen rich gas is fed in an amount sufficient to maintain a continuous gas phase in the three-phase reaction zone. In some embodiments, about 50 to about 900 scf/bbl of hydrogen is fed to the three-phase reaction zone. In some embodiments, about 60 to about 600 scf/bbl of hydrogen is fed to the three-phase reaction zone. In some embodiments, about 80 to about 400 scf/bbl of hydrogen is fed to the three-phase reaction zone. In some embodiments, about 80 to about 200 scf/bbl of hydrogen is fed to the three-phase reaction zone. In some embodiments, about 80 to about 120 scf/bbl of hydrogen is fed to the three-phase reaction zone.

Typically, the diesel feed is fed to the three-phase reaction zone at a rate to provide a liquid hourly space velocity (LHSV) of from about 0.5 to about 15 $hr^{-1}$. In some embodiments, the diesel feed is fed to the three-phase reaction zone at a rate to provide a liquid hourly space velocity (LHSV) of from about 1 to about 10 $hr^{-1}$. In some embodiments, the diesel feed is fed to the three-phase reaction zone at a rate to provide a liquid hourly space velocity (LHSV) of from about 1 to about 5 $hr^{-1}$.

In some embodiments of this invention, at least a portion of the hydrogen rich gas and the diesel feed are combined or admixed and co-fed to the three-phase reaction zone. In some embodiments, the diesel feed and the hydrogen rich gas are fed to the three-phase reaction zone separately.

In this disclosure, the three-phase reaction zone temperature is determined by using WABT. Typically, the three-phase reaction zone has a temperature from about 260° C. to about 382° C., in some embodiments from about 260° C. to about 371° C., in some embodiments from about 282° C. to about 371° C., in some embodiments from about 293° C. to about 360° C., in some embodiments from about 304° C. to about 360° C., and in some embodiments from about 304° C. to about 355° C.

Typically, the three-phase reaction zone has a pressure from about 100 to about 1300 psig, in some embodiments from about 300 to about 1000 psig, and in some embodiments from about 300 to about 700 psig.

Typically, hydrogen consumption in the three-phase reaction zone is in the range of about −150 to about 150 scf/bbl. In some embodiments, the hydrogen consumption in the three-phase reaction zone is in the range of about −100 to about 100 scf/bbl, or in the range of about −80 to about 80 scf/bbl, or in the range of about −50 to about 100 scf/bbl, or in the range of about −50 to about 80 scf/bbl, or in the range of about −30 to about 80 scf/bbl, or in the range of about −10 to about 70 scf/bbl, or in the range of about 0 to about 60 scf/bbl, or in the range of about 5 to about 50 scf/bbl.

Essentially no naphtha is produced in the three-phase reaction zone. Typically, the naphtha yield is no more than about 5 wt %. In some embodiments, the naphtha yield is no more than about 4 wt %, 3 wt %, 2 wt %, 1 wt %, 0.5 wt %, or 0.2 wt %.

The hydrotreated diesel effluent produced in the three-phase reaction zone typically comprises diesel and hydrogen sulfide. It may also comprises hydrogen and in some embodiments further comprises ammonia, and/or C1 to C4 hydrocarbons.

The hydrotreated diesel effluent from the three-phase reaction zone may be directed to a separation zone to generate a hydrogen recycle gas stream and remove hydrogen sulfide from the hydrotreated diesel effluent to produce a desired diesel product. In some embodiments, the separation zone comprises a flash vessel, or a stripping vessel, or combinations thereof. In some embodiments, the separation zone comprises a stripping vessel. In some embodiments, there is no fractionating column in the separation zone.

The stripping vessel uses a stripping gas to remove gaseous compounds such as hydrogen sulfide from the hydrotreated diesel effluent. In some embodiments, the stripping gas comprises, consists essentially of, or consists of a nitrogen gas. In some embodiments, the stripping gas comprises at least 75%, 80%, 85%, 90%, 95%, or 98% of nitrogen by volume.

The separation zone separates or removes vapor materials from the hydrotreated diesel effluent to form a gas effluent and a liquid effluent. The gas effluent comprises hydrogen and hydrogen sulfide. In some embodiments, the gas effluent further comprises ammonia, and/or C1 to C4 hydrocarbons and the like. The gas effluent is hydrogen rich and can be purified to form a hydrogen recycle gas stream. The hydrogen recycle gas stream can be used as all or part of the hydrogen rich gas fed to the three-phase reaction zone. The liquid effluent comprises, consists essentially of, or consists of the diesel product.

The yield of the diesel product typically is at least about 80 wt %. In some embodiments, the yield of the diesel product is at least about 85 wt %, 90 wt %, 95 wt %, or 98 wt %.

The diesel product typically has a sulfur content no more than about 300 wppm. In some embodiments, the diesel product has a sulfur content no more than about 100 wppm, or no more than about 50 wppm, or no more than about 20 wppm, or no more than about 10 wppm.

The diesel product typically has a nitrogen content no more than about 100 wppm. In some embodiments, the diesel product has a nitrogen content no more than about 50 wppm, or no more than about 30 wppm, or no more than about 20 wppm, or no more than about 10 wppm, or no more than about 7 wppm, or no more than about 5 wppm.

The diesel product typically has a monoaromatic content in the range of about 10 to about 50 wt %. In some embodiments, the diesel product has a monoaromatic content in the range of about 15 to about 45 wt %, or in the range of about 15 to about 35 wt %, or in the range of about 20 to about 35 wt %, or in the range of about 25 to about 30 wt %.

The diesel product typically has a polyaromatic content in the range of about 0.5 to about 20 wt %. In some embodiments, the diesel product has a polyaromatic content in the range of about 1 to about 15 wt %, or in the range of about 1 to about 10 wt %, or in the range of about 1 to about 8 wt %, or in the range of about 2 to about 7 wt %, or in the range of about 3 to about 6 wt %.

The diesel product typically has a density in the range of about 0.7 to about 0.95 g/ml at 15.6° C. In some embodiments, the diesel product has a density in the range of about 0.75 to about 0.85 g/ml at 15.6° C., or in the range of about 0.78 to about 0.88 g/ml at 15.6° C., or in the range of about 0.80 to about 0.85 g/ml at 15.6° C., or in the range of about 0.81 to about 0.85 g/ml at 15.6° C., or in the range of about 0.82 to about 0.84 g/ml at 15.6° C.

The diesel product typically has a cetane index value in the range of about 15 to about 60. In some embodiments, the diesel product has a cetane index value in the range of about 30 to about 60, or in the range of about 30 to about 55, or in the range of about 35 to about 55, or in the range of about 40 to about 50, or in the range of about 42 to about 48.

In some embodiments of this invention, the hydrotreating reactions can be conducted in a liquid-full reaction zone. In such aspects, the present disclosure provides a liquid-full process for producing diesel with reduced levels of sulfur. The process comprises: (a) providing a diesel feed comprising a diesel having a sulfur content in the range of about 20 to about 10,000 wppm; (b) contacting the diesel feed with (i) a diluent and (ii) a hydrogen rich gas to form a feed/diluent/hydrogen mixture, wherein the hydrogen is dissolved in the mixture to provide a liquid feed; (c) contacting the feed/diluent/hydrogen mixture with a hydrotreating catalyst in a liquid-full reaction zone to produce a hydrotreated diesel effluent comprising diesel and hydrogen sulfide; (d) optionally recycling a portion of the hydrotreated diesel effluent as a hydrocarbon recycle stream for use as all or part of the diluent in step (b)(i) at a recycle ratio of no more than about 10; and (e) removing hydrogen sulfide from at least a portion of the hydrotreated diesel effluent not recycled to produce a diesel product having a sulfur content no more than about 100 wppm; wherein hydrogen consumption in the reaction zone is in the range of about −150 to about 150 scf/bbl.

In some embodiments of this invention, the at least a portion of the hydrotreated diesel effluent not recycled may be processed further as desired prior to the hydrogen sulfide removal step (e). For example, the at least a portion of the hydrotreated diesel effluent not recycled may be further hydrotreated to remove more sulfur or nitrogen contaminants prior to the hydrogen sulfide removal step (e). Such further hydrotreating can be conducted in a trickle bed reactor or a liquid-full reactor.

By "liquid-full" it is meant herein that substantially all of the hydrogen is dissolved in a liquid-phase hydrocarbon feed mixture to a reaction zone wherein the liquid feed contacts a catalyst. The continuous phase through a liquid-full reaction zone is a liquid phase. In some embodiments of this invention, essentially no gas phase hydrogen is present in the liquid-full reaction zone.

The diluent typically comprises, consists essentially of, or consists of the hydrocarbon recycle stream which is a portion of the hydrotreated diesel effluent that is recycled and combined with the diesel feed before or after contacting the feed with a hydrogen rich gas, preferably before contacting the feed with a hydrogen rich gas. In some embodiments, the diluent is the recycled portion of the hydrotreated diesel effluent.

In some embodiments of this invention, the liquid-full process is conducted without recycling any of the hydrotreated diesel effluent. In such embodiments, the recycle ratio is zero.

In some embodiments of this invention, the liquid-full process is conducted with recycling a portion of the hydrotreated diesel effluent as a hydrocarbon recycle stream.

In some embodiments of this invention, the liquid-full process is conducted with a single recycle loop. By "single recycle loop" is meant herein, a portion (based on the selected recycle ratio) of the hydrotreated diesel effluent is recirculated as a hydrocarbon recycle stream from the outlet of the liquid-full reaction zone to the inlet of the liquid-full reaction zone. Thus, all catalyst beds in the liquid-full reaction zone are included in the one recycle loop. There is no separate recycles for individual catalyst beds or reactors.

In some embodiments of this invention, the recycle ratio in step (d) is from about 0.1 to about 10. In some embodiments, the recycle ratio in step (d) is from about 0.1 to about 5. In some embodiments, the recycle ratio in step (d) is from about 0.1 to about 2. In some embodiments, the recycle ratio in step (d) is from about 0.1 to about 1. In some embodiments, the recycle ratio in step (d) is no more than about 10, 8, 6, 4, 2, or 1. Recycle ratio is based on volume of hydrocarbon recycle stream to volume of diesel feed fed to the reaction zone.

In addition to hydrocarbon recycle stream, the diluent may comprise any other organic liquid that is compatible with the diesel feed and catalysts. When the diluent comprises an organic liquid in addition to the hydrocarbon recycle stream, preferably the organic liquid is a liquid in which hydrogen has a higher solubility compared with the diesel feed. In some embodiments, the organic liquid is selected from the group consisting of propane, butane, pentane, hexane, and combinations thereof. When the diluent comprises an organic liquid, the organic liquid is typically present in an amount of no greater than 80%, based on the total weight of the diesel feed and diluent, in some embodiments 50-70%, and in some embodiments 10-60%.

In step (b), a diesel feed is contacted with a diluent and a hydrogen rich gas. The feed can be contacted first with hydrogen rich gas and then with the diluent, or preferably, first with the diluent and then with hydrogen rich gas to produce a feed/diluent/hydrogen mixture.

In some embodiments of this invention, the liquid-full process can be conducted without a diluent and without recycling a portion of the hydrotreated diesel effluent as a recycle stream. In such aspects, the present disclosure provides a liquid-full process for producing diesel with reduced levels of sulfur. The liquid-full process comprises: (a) providing a diesel feed comprising a diesel having a sulfur content in the range of about 20 to about 10,000 wppm; (b) contacting the diesel feed with a hydrogen rich gas to form a feed/hydrogen mixture, wherein the hydrogen is dissolved in the mixture to provide a liquid feed, and the mixture is not diluted with a diluent; (c) contacting the feed/hydrogen mixture with a hydrotreating catalyst in a liquid-full reaction zone to produce a hydrotreated diesel effluent comprising diesel and hydrogen sulfide; and (d) removing hydrogen sulfide from the hydrotreated diesel effluent to produce a diesel product having a sulfur content no more than about 100 wppm; wherein hydrogen consumption in the reaction zone is in the range of about −150 to about 150 scf/bbl. In step (b), a diesel feed is contacted with a hydrogen rich gas to form a feed/hydrogen mixture which is not diluted with a diluent or a hydrocarbon recycle stream. In step (c), such undiluted feed/hydrogen mixture is contacted with a hydrotreating catalyst in a liquid-full reaction zone to produce a hydrotreated diesel effluent.

The liquid-full reaction zone may comprise one or more reactors in liquid communication, and each reactor may independently comprise one or more catalyst beds. In some embodiments, the liquid-full process can be conducted in a single reactor comprising one or more catalyst beds.

In some embodiments, in a column reactor or other single vessel containing two or more catalyst beds or between multiple reactors, the beds are physically separated by a catalyst-free zone. In some embodiments, each reactor is a fixed bed reactor and may be of a plug flow, tubular or other design packed with a solid catalyst (i.e. a packed bed reactor).

In some embodiments of this invention, the liquid-full reaction zone comprises two or more catalyst beds disposed in sequence, and the catalyst volume increases in each subsequent catalyst bed. Such two or more catalyst beds can be disposed in a single reactor or in two or more reactors disposed in sequence. As a result, the hydrogen consumption is more evenly distributed among the beds.

It was found through experiments that when catalyst distribution in a liquid-full reaction zone is uneven and catalyst volume increases with each subsequent catalyst bed, the same catalyst and the same total volume catalyst provides higher sulfur conversion as compared to an even catalyst volume distribution.

In some embodiments of this invention, the liquid-full reaction zone comprises two or more catalyst beds disposed in sequence, wherein each catalyst bed contains a catalyst having a catalyst volume, and wherein a distribution of the catalyst volumes among the catalyst beds is determined in a way so that the hydrogen consumption for each catalyst bed is essentially equal.

It was found through experiments that the essentially equal hydrogen consumption in each catalyst bed allows for minimizing the recycle ratio. A reduced recycle ratio results in increased sulfur removal.

The hydrogen rich gas is fed to the liquid-full reaction zone to effect hydrotreating reactions. In some embodiments of this invention, about 5 to about 200 scf/bbl of hydrogen, or about 5 to about 150 scf/bbl of hydrogen, or about 5 to about 100 scf/bbl of hydrogen, or about 10 to about 200 scf/bbl of hydrogen, or about 10 to about 150 scf/bbl of hydrogen, or about 10 to about 100 scf/bbl of hydrogen, or about 10 to about 80 scf/bbl of hydrogen, or about 10 to about 70 scf/bbl of hydrogen, or about 10 to about 60 scf/bbl of hydrogen, or about 20 to about 200 scf/bbl of hydrogen, or about 20 to about 150 scf/bbl of hydrogen, or about 20 to about 100 scf/bbl of hydrogen, or about 20 to about 80 scf/bbl of hydrogen, or about 20 to about 60 scf/bbl of hydrogen is fed to the liquid-full reaction zone.

In some embodiments, no more than about 200 scf/bbl of hydrogen, or no more than about 150 scf/bbl of hydrogen, or no more than about 120 scf/bbl of hydrogen, or no more than about 100 scf/bbl of hydrogen, or no more than about 80 scf/bbl of hydrogen is fed to the liquid-full reaction zone.

In some embodiments of this invention, a hydrogen rich gas can be fed between the catalyst beds to increase hydrogen content in the liquid effluent between the catalyst beds. Hydrogen dissolves in the liquid effluent in the catalyst-free zone so that the catalyst bed is a liquid-full reaction zone. Thus, fresh hydrogen can be added into the feed/diluent (if present)/hydrogen mixture or effluent from a previous reactor (in series) at the catalyst-free zone, where the fresh hydrogen dissolves in the mixture or effluent prior to contact with the subsequent catalyst bed. A catalyst-free zone in advance of a catalyst bed is illustrated, for example, in U.S. Pat. No. 7,569,136. In some embodiments, fresh hydrogen is added between each two catalyst beds. In some embodiments, fresh hydrogen is added at the inlet of each reactor.

In some embodiments of this invention, the liquid feed (the feed/diluent/hydrogen mixture if diluent is present, or the feed/hydrogen mixture if diluent is not present) is fed to the liquid-full reaction zone at a rate to provide a liquid hourly space velocity (LHSV) of from about 0.5 to about 15 $hr^{-1}$. In some embodiments, the liquid feed is fed to the liquid-full reaction zone at a rate to provide a liquid hourly space velocity (LHSV) of from about 1 to about 10 $hr^{-1}$. In some embodiments, the liquid feed is fed to the liquid-full reaction zone at a rate to provide a liquid hourly space velocity (LHSV) of from about 1 to about 5 $hr^{-1}$.

In this disclosure, the liquid-full reaction zone temperature is determined by using WABT. Typically, the liquid-full reaction zone has a temperature from about 260° C. to about 382° C., in some embodiments from about 260° C. to about 371° C., in some embodiments from about 282° C. to about 371° C., in some embodiments from about 293° C. to about 360° C., in some embodiments from about 304° C. to about 360° C., and in some embodiments from about 304° C. to about 355° C.

Typically, the liquid-full reaction zone has a pressure from about 100 to about 1300 psig, in some embodiments from about 300 to about 1000 psig, and in some embodiments from about 300 to about 700 psig.

Typically, hydrogen consumption in the liquid-full reaction zone is in the range of about −150 to about 150 scf/bbl. In some embodiments, the hydrogen consumption in the liquid-full reaction zone is in the range of about −100 to about 100 scf/bbl, or in the range of about −80 to about 80 scf/bbl, or in the range of about −50 to about 100 scf/bbl, or in the range of about −50 to about 80 scf/bbl, or in the range of about −30 to about 80 scf/bbl, or in the range of about −10 to about 70 scf/bbl, or in the range of about 0 to about 60 scf/bbl, or in the range of about 5 to about 50 scf/bbl.

Essentially no naphtha is produced in the liquid-full reaction zone. Typically, the naphtha yield is no more than about 5 wt %. In some embodiments, the naphtha yield is no more than about 4 wt %, 3 wt %, 2 wt %, 1 wt %, 0.5 wt %, 0.2 wt %, or 0.1 wt %.

In the liquid-full reaction zone, organic nitrogen and organic sulfur are converted to ammonia (hydrodenitrogenation) and hydrogen sulfide (hydrodesulfurization), respectively. When more than one catalyst bed or reactor are present in the reaction zone, in some embodiments, there is no separation of ammonia and hydrogen sulfide and remaining hydrogen from the effluent of the preceding catalyst bed or reactor prior to feeding the effluent to the subsequent catalyst bed or reactor. The resulting ammonia and hydrogen sulfide during the hydrotreating reaction remain in the hydrotreated diesel effluent. In some embodiments, there is no separation of ammonia and hydrogen sulfide and remaining hydrogen from the recycled portion of the hydrotreated diesel effluent. In some embodiments, hydrogen sulfide and ammonia (if present) are removed from the hydrotreated diesel effluent before it is recycled.

The hydrotreated diesel effluent produced in the liquid-full reaction zone typically comprises diesel and hydrogen sulfide. It may also comprises hydrogen and in some embodiments further comprises ammonia, and/or C1 to C4 hydrocarbons.

The hydrotreated diesel effluent from the liquid-full reaction zone may be directed to a separation zone to remove hydrogen sulfide from the hydrotreated diesel effluent to produce a desired diesel product. In some embodiments, the separation zone comprises a flash vessel, or a stripping vessel, or combinations thereof. In some embodiments, the separation zone comprises a stripping vessel. In some embodiments, there is no fractionating column in the separation zone.

The stripping vessel uses a stripping gas to remove gaseous compounds such as hydrogen sulfide from the hydrotreated diesel effluent. If hydrogen, ammonia, or C1 to C4 hydrocarbons are present in the hydrotreated diesel effluent, they can also be removed by using the stripping vessel. In some embodiments, the stripping gas comprises, consists essentially of, or consists of a nitrogen gas. In some embodiments, the stripping gas comprises at least 75%, 80%, 85%, 90%, 95%, or 98% of nitrogen by volume.

The separation zone separates or removes vapor materials from the hydrotreated diesel effluent to form a gas effluent and a liquid effluent. The gas effluent typically comprises hydrogen and hydrogen sulfide. In some embodiments, the gas effluent further comprises ammonia, and/or C1 to C4 hydrocarbons and the like. The liquid effluent comprises, consists essentially of, or consists of the diesel product.

The yield of the diesel product typically is at least about 80 wt %. In some embodiments, the yield of the diesel product is at least about 85 wt %, 90 wt %, 95 wt %, or 98 wt %.

The diesel product typically has a sulfur content no more than about 300 wppm. In some embodiments, the diesel product has a sulfur content no more than about 100 wppm, or no more than about 50 wppm, or no more than about 20 wppm, or no more than about 10 wppm.

The diesel product typically has a nitrogen content no more than about 100 wppm. In some embodiments, the diesel product has a nitrogen content no more than about 50 wppm, or no more than about 30 wppm, or no more than about 20 wppm, or no more than about 10 wppm, or no more than about 7 wppm, or no more than about 5 wppm.

The diesel product typically has a monoaromatic content in the range of about 10 to about 50 wt %. In some embodiments, the diesel product has a monoaromatic content in the range of about 15 to about 45 wt %, or in the range of about 15 to about 35 wt %, or in the range of about 20 to about 35 wt %, or in the range of about 25 to about 30 wt %.

The diesel product typically has a polyaromatic content in the range of about 0.5 to about 20 wt %. In some embodiments, the diesel product has a polyaromatic content in the range of about 1 to about 15 wt %, or in the range of about 1 to about 10 wt %, or in the range of about 1 to about 8 wt %, or in the range of about 2 to about 7 wt %, or in the range of about 3 to about 6 wt %.

The diesel product typically has a density in the range of about 0.7 to about 0.95 g/ml at 15.6° C. In some embodiments, the diesel product has a density in the range of about 0.75 to about 0.85 g/ml at 15.6° C., or in the range of about 0.78 to about 0.88 g/ml at 15.6° C., or in the range of about 0.80 to about 0.85 g/ml at 15.6° C., or in the range of about 0.81 to about 0.85 g/ml at 15.6° C., or in the range of about 0.82 to about 0.84 g/ml at 15.6° C.

The diesel product typically has a cetane index value in the range of about 15 to about 60. In some embodiments, the diesel product has a cetane index value in the range of about 30 to about 60, or in the range of about 30 to about 55, or in the range of about 35 to about 55, or in the range of about 40 to about 50, or in the range of about 42 to about 48.

Many aspects and embodiments have been described above and are merely exemplary and not limiting. After reading this specification, skilled artisans appreciate that other aspects and embodiments are possible without departing from the scope of the invention.

EXAMPLES

The concepts described herein will be further described in the following examples, which do not limit the scope of the invention described in the claims.
Analytical Methods and Terms
ASTM Standards. All ASTM Standards are available from ASTM International, West Conshohocken, Pa., www.astm.org.

Amounts of sulfur and nitrogen are provided in parts per million by weight, wppm.

Total Sulfur was measured using ASTM D4294 (2008), "Standard Test Method for Sulfur in Petroleum and Petroleum Products by Energy Dispersive X-ray Fluorescence Spectrometry," DOI: 10.1520/D4294-08 and ASTM D7220 (2006), "Standard Test Method for Sulfur in Automotive Fuels by Polarization X-ray Fluorescence Spectrometry," DOI: 10.1520/D7220-06.

Total Nitrogen was measured using ASTM D4629 (2007), "Standard Test Method for Trace Nitrogen in Liquid Petroleum Hydrocarbons by Syringe/Inlet Oxidative Combustion and Chemiluminescence Detection," DOI: 10.1520/D4629-07 and ASTM D5762 (2005), "Standard Test Method for Nitrogen in Petroleum and Petroleum Products by Boat-Inlet Chemiluminescence," DOI: 10.1520/D5762-05.

Aromatic content was determined using ASTM Standard D5186-03(2009), "Standard Test Method for Determination of Aromatic Content and Polynuclear Aromatic Content of Diesel Fuels and Aviation Turbine Fuels by Supercritical Fluid Chromatography", DOI: 10.1520/D5186-03R09.

Boiling point distribution was determined using ASTM D2887 (2008), "Standard Test Method for Boiling Range Distribution of Petroleum Fractions by Gas Chromatography," DOI: 10.1520/D2887-08. ASTM D86 equivalent boiling points were calculated using correlations provided within ASTM D2887 standard.

Density, Specific Gravity and API Gravity were measured using ASTM Standard D4052 (2009), "Standard Test Method for Density, Relative Density, and API Gravity of Liquids by Digital Density Meter," DOI: 10.1520/D4052-09.

"API gravity" refers to American Petroleum Institute gravity, which is a measure of how heavy or light a petroleum liquid is compared to water. If API gravity of a petroleum liquid is greater than 10, it is lighter than water and floats; if less than 10, it is heavier than water and sinks. API gravity is thus an inverse measure of the relative density of a petroleum liquid and the density of water, and is used to compare relative densities of petroleum liquids.

The formula to obtain API gravity of petroleum liquids from specific gravity (SG) is:

$$\text{API gravity}=(141.5/SG)-131.5$$

Cetane index is useful to estimate cetane number (measure of combustion quality of a diesel fuel) when a test engine is not available or if sample size is too small to determine this property directly. Cetane index was determined by ASTM Standard D4737 (2009a), "Standard Test Method for Calculated Cetane Index by Four Variable Equation," DOI: 10.1520/D4737-09a.

"WABT" means weighted average bed temperature.
Pre-sulfiding Procedure

The catalysts were dried overnight at 115° C. under a total flow of 210 to 350 standard cubic centimeters per minute (sccm) of hydrogen. The pressure was 6.9 MPa (69 bar). The catalyst-charged reactors were heated to 176° C. with a flow of charcoal lighter fluid through the catalyst beds. Sulfur spiking agent (1 wt % sulfur, added as 1-dodecanethiol) and hydrogen gas were introduced into the charcoal lighter fluid at 176° C. to start to pre-sulfide the catalysts. The pressure was 6.9 MPa (69 bar). The temperature in each reactor was increased gradually to 320° C. Pre-sulfiding was continued at 320° C. until a breakthrough of hydrogen sulfide ($H_2S$) at the outlet of the last Reactor. After pre-sulfiding, the catalysts were stabilized by flowing a straight run diesel (SRD) feed through the catalyst beds at a temperature from 320° C. to 355° C. and at 6.9 MPa (1000 psig or 69 bar) for 10 hours.
Reactors Each reactor used in the examples below was of 19 mm (¾") OD 316L stainless steel tubing and about 49 cm (19¼") to 61 cm (24") in length with reducers to 6 mm (¼") on each end. Both ends of the reactors were first capped with metal mesh to prevent catalyst leakage. Below the metal mesh, the reactors were packed with layers of 1 mm glass beads at both ends. Catalyst was packed in the middle section of the reactor.

Each reactor used in the examples below was placed in a temperature controlled sand bath in a 7.6 cm (3") OD and 120 cm long pipe filled with fine sand. Temperature was monitored at the inlet and outlet of each reactor as well as in each sand bath. The temperature in each reactor was controlled using heat tapes wrapped around the 3" OD pipe and connected to temperature controllers.

The following examples are presented to illustrate specific embodiments of the present disclosure and not to be considered in any way as limiting the scope of the invention.

Experiments of this disclosure were conducted under liquid-full conditions with or without recycling a portion of the hydrotreated diesel effluent as a hydrocarbon recycle stream. Each reactor was a liquid-full reactor. The contaminated diesel was mixed with hydrogen and a hydrocarbon recycle stream (if present) to form the feed/diluent (if present)/hydrogen mixture. In experiments of this disclosure, the diluent is the hydrocarbon recycle stream. No additional diluents other than the hydrocarbon recycle stream was added to the feed mixture.

Experiments of this disclosure were conducted with a single recycle loop if there was a recycle stream. After exiting the last reactor, the hydrotreated diesel effluent was directed to a high pressure flash tank where the liquid-vapor separation was effected. A portion of the liquid effluent from the flash tank was recycled to join the fresh diesel feed at the inlet of the first reactor, and the rest of the liquid effluent was directed to a stripping vessel to further remove vapor materials from the hydrotreated diesel effluent to produce the diesel product.

When there was no recycle stream, the hydrotreated diesel effluent was directed to a separation zone having a flash tank and a stripping vessel, where the liquid-vapor separation was effected to produce a liquid effluent as the diesel product.

Nitrogen was used as the stripping gas in experiments of this disclosure. The gas effluents from the flash tank and the stripping vessel were combined. The composition of the combined gas effluents was analyzed by using GC with FID and ECD detectors. The flow rate of the combined gas effluents was measured by using gas mass flow meters. The hydrogen amount exiting the reaction zone was determined based on the composition and the flow rate of the combined gas effluents.

Examples 1-17

The properties of a contaminated diesel from a commercial pipeline terminal used in Examples 1-17 are shown in Table 1. The contaminated diesel was hydrotreated in an experimental pilot unit containing two to four fixed bed reactors in series.

TABLE 1

Properties of Contaminated Diesel Used in Examples 1-17

| Property | Unit | Value |
| --- | --- | --- |
| Sulfur | wppm | 352.8 |
| Nitrogen | wppm | 14.9 |
| Density at 15.6° C. | g/ml | 0.8318 |
| API Gravity | | 38.4 |
| Monoaromatic Compounds | wt % | 27.1 |

TABLE 1-continued

Properties of Contaminated Diesel Used in Examples 1-17

| | | |
| --- | --- | --- |
| Diaromatic Compounds | wt % | 4.3 |
| Polyaromatic Compounds | wt % | 4.5 |
| Cetane Index | | 45.6 |
| Boiling Point Distribution (ASTM D86) | wt % | ° C. |
| IBP = Initial boiling point | IBP | 176 |
| | 5 | 188 |
| | 10 | 194 |
| | 20 | 204 |
| | 30 | 214 |
| | 50 | 235 |
| | 70 | 260 |
| | 80 | 278 |
| | 90 | 303 |
| | 95 | 325 |
| FBP = Final boiling point | FBP | 343 |

The reactors contained a hydrotreating catalyst comprising CoMo on γ-Al$_2$O$_3$ support. It was in the form of extrudates of a quadralobe about 1.3 mm diameter and 10 mm long. About 11 ml, 33 ml, 48 ml, and 58 ml of catalyst were loaded in the first, second, third, and fourth reactors, respectively. Reactor 1 was packed with layers of 37 ml (bottom) and 39 ml (top) of glass beads; Reactor 2 was packed with a layer of 26 ml (bottom) and 27 ml (top) of glass beads; Reactor 3 was packed with a layer of 19 ml (bottom) and 19 ml (top) of glass beads; and Reactor 4 was packed with a layer of 14 ml (bottom) and 15 ml (top) of glass beads.

Examples 1-6 used all four Reactors. Examples 7-16 used Reactors 1-3. Example 17 used Reactors 1-2.

Hydrogen was fed from compressed gas cylinders and the flow rates were measured using mass flow controllers. The hydrogen was injected and mixed with the combined fresh diesel feed and the hydrocarbon recycle stream (if present) before Reactor 1. After the catalysts were pre-sulfided and stabilized, the combined "feed/hydrogen/hydrocarbon recycle stream (if present)" stream flowed downwardly through a first temperature-controlled sand bath in a 6 mm OD tubing and then in an up-flow mode through Reactor 1. After exiting Reactor 1, additional hydrogen was injected in the effluent of Reactor 1 (feed to Reactor 2). The feed to Reactor 2 flowed downwardly through a second temperature-controlled sand bath in a 6 mm OD tubing and then in an up-flow mode through Reactor 2. After exiting Reactor 2, more hydrogen was dissolved in the effluent of Reactor 2 (feed to Reactor 3). The liquid feed to Reactors 3 and 4 followed the same pattern, with hydrogen gas injection before each reactor.

Reaction conditions and the properties of the diesel product are shown in Table 2.

TABLE 2

Summary of Examples 1-17

| Ex. No. | WABT | P | LHSV (hr$^{-1}$) | RR | H$_2$ Feed | H$_2$ Cons. | S | N | Density | Mono | Di | Poly |
|---|---|---|---|---|---|---|---|---|---|---|---|---|
| 1 | 660 | 600 | 2.0 | 0.0 | 107 | −17 | 2.6 | 2.5 | 0.8274 | 26.5 | 5.0 | 5.4 |
| 2 | 640 | 600 | 2.0 | 0.0 | 98 | 24 | 1.3 | 2.4 | 0.8298 | 25.4 | 3.8 | 4.1 |
| 3 | 620 | 600 | 2.0 | 0.0 | 89 | 49 | 2.8 | 2.3 | 0.8297 | 25.7 | 3.0 | 3.2 |
| 4 | 600 | 600 | 2.0 | 0.0 | 80 | 43 | 2.8 | 2.6 | 0.8300 | 26.1 | 3.3 | 3.5 |
| 5 | 600 | 600 | 3.0 | 0.0 | 80 | 37 | 4.0 | 3.4 | 0.8303 | 27.4 | 2.8 | 3.1 |
| 6 | 580 | 600 | 3.0 | 0.0 | 78 | 40 | 9.4 | 3.4 | 0.8303 | 28.3 | 2.7 | 2.8 |
| 7 | 600 | 600 | 2.0 | 0.0 | 77 | 47 | 3.5 | 2.3 | 0.8299 | 26.1 | 3.0 | 3.1 |
| 8 | 620 | 600 | 2.0 | 0.0 | 82 | 33 | 1.9 | 2.4 | 0.8298 | 26.3 | 4.2 | 4.3 |
| 9 | 620 | 600 | 3.0 | 0.0 | 83 | 41 | 3.1 | 2.7 | 0.8301 | 26.6 | 4.1 | 4.2 |
| 10 | 620 | 600 | 3.0 | 1.0 | 82 | 40 | 4.8 | 3.0 | 0.8302 | 26.3 | 3.6 | 3.7 |
| 11 | 620 | 600 | 3.0 | 2.0 | 99 | 39 | 6.9 | 2.9 | 0.8302 | 26.7 | 3.3 | 3.4 |
| 12 | 580 | 600 | 3.0 | 0.0 | 76 | 39 | 7.2 | 3.3 | 0.8271 | 27.9 | 3.2 | 3.3 |
| 13 | 600 | 600 | 3.0 | 0.0 | 78 | 38 | 4.9 | 2.9 | 0.8302 | 26.9 | 2.4 | 2.5 |
| 14 | 600 | 600 | 3.0 | 2.0 | 77 | 38 | 9.7 | 3.9 | 0.8304 | 27.0 | 2.8 | 3.0 |
| 15 | 660 | 600 | 4.0 | 2.0 | 97 | 2 | 9.0 | 4.4 | 0.8309 | 26.3 | 4.9 | 5.3 |
| 16 | 680 | 600 | 4.0 | 2.0 | 98 | −34 | 8.5 | 4.5 | 0.8314 | 26.4 | 5.4 | 5.9 |
| 17 | 620 | 600 | 3.0 | 0.0 | 77 | 56 | 4.5 | 3.2 | 0.8298 | 27.6 | 3.0 | 3.1 |

WABT indicates reaction temperature in Fahrenheit (° F.); P is reactor pressure in psig; RR is recycle ratio; H$_2$ Feed is the rate of hydrogen fed to the reaction zone and is expressed in scf/bbl; H$_2$ Cons is the hydrogen consumption in the reaction zone and is expressed in scf/bbl; S is the sulfur content in the diesel product and is expressed in wppm; N is the nitrogen content in the diesel product and is expressed in wppm; Density is the density of the diesel product and is expressed in g/ml at 15.6° C.; Mono is the monoaromatic content of the diesel product and is expressed as a weight percentage; Di is the diaromatic content of the diesel product and is expressed as a weight percentage; Poly is the polyaromatic content of the diesel product and is expressed as a weight percentage.

Examples 18-21

The same contaminated diesel sample as used in Examples 1-17 was hydrotreated in an experimental pilot unit containing two fixed bed reactors in series.

The reactors contained a hydrotreating catalyst comprising CoMo on γ-Al$_2$O$_3$ support. It was in the form of extrudates of a quadralobe about 1.3 mm diameter and 10 mm long. About 22.5 ml and 67.5 ml of catalyst were loaded in the first and second reactors, respectively. Reactor 1 was packed with layers of 31 ml (bottom) and 31 ml (top) of glass beads; Reactor 2 was packed with a layer of 8 ml (bottom) and 9 ml (top) of glass beads.

Hydrogen was fed from compressed gas cylinders and the flow rates were measured using mass flow controllers. The hydrogen was injected and mixed with the fresh diesel feed before Reactor 1. There was no recycle stream or diluent in Examples 18-21. After the catalysts were pre-sulfided and stabilized, the feed/hydrogen mixture flowed downwardly through a first temperature-controlled sand bath in a 6 mm OD tubing and then in an up-flow mode through Reactor 1. After exiting Reactor 1, additional hydrogen was injected in the effluent of Reactor 1 (feed to Reactor 2). The feed to Reactor 2 flowed downwardly through a second temperature-controlled sand bath in a 6 mm OD tubing and then in an up-flow mode through Reactor 2.

Reaction conditions and the properties of the diesel product are shown in Table 3. Legends used in Table 3 have the same meanings as ones used in Table 2 above.

TABLE 3

Summary of Examples 18-21

| Ex. No. | WABT | P | LHSV (hr$^{-1}$) | H$_2$ Feed | H$_2$ Cons. | S | N | Density | Mono | Di | Poly |
|---|---|---|---|---|---|---|---|---|---|---|---|
| 18 | 520 | 600 | 3.6 | 64 | 35 | 95.8 | 6.1 | 0.8320 | 28.7 | 2.5 | 2.6 |
| 19 | 540 | 600 | 3.6 | 66 | 37 | 27.4 | 4.6 | 0.8294 | 29.0 | 2.7 | 2.7 |
| 20 | 580 | 600 | 5.0 | 68 | 33 | 14.8 | 5.2 | 0.8307 | 28.4 | 2.5 | 2.6 |
| 21 | 580 | 600 | 3.6 | 70 | 39 | 7.0 | 3.9 | 0.8305 | 27.7 | 3.1 | 3.2 |

Examples 22-47

The properties of a contaminated diesel from a different commercial pipeline terminal used in Examples 22-47 are shown in Table 4. The contaminated diesel was hydrotreated in an experimental pilot unit containing one or two fixed bed reactors.

TABLE 4

Properties of Contaminated Diesel Used in Examples 22-47

| Property | Unit | Value |
|---|---|---|
| Sulfur | wppm | 282 |
| Nitrogen | wppm | 10 |
| Density at 15.6° C. | g/ml | 0.8363 |
| API Gravity | | 37.5 |
| Monoaromatic Compounds | wt % | 28.6 |
| Diaromatic Compounds | wt % | 2.9 |
| Polyaromatic Compounds | wt % | 3.1 |
| Cetane Index | | 43.8 |

TABLE 4-continued

Properties of Contaminated Diesel Used in Examples 22-47

| Boiling Point Distribution (ASTM D86) | | wt % | ° C. |
|---|---|---|---|
| IBP = Initial boiling point | IBP | | 172 |
| | 5 | | 184 |
| | 10 | | 191 |
| | 20 | | 202 |
| | 30 | | 213 | stabilized, the feed/hydrogen mixture flowed downwardly through a first temperature-controlled sand bath in a 6 mm OD tubing and then in an up-flow mode through Reactor 1. After exiting Reactor 1, additional hydrogen was injected in the effluent of Reactor 1 (feed to Reactor 2). The feed to Reactor 2 flowed downwardly through a second temperature-controlled sand bath in a 6 mm OD tubing and then in an up-flow mode through Reactor 2.

Reaction conditions and the properties of the diesel product are shown in Table 5 below. Legends used in Table 5 have the same meanings as ones used in Table 2 above.

TABLE 5

Summary of Examples 22-47

| Ex. No. | WABT | P | LHSV (hr$^{-1}$) | H$_2$ Feed | H$_2$ Cons. | S | N | Density | Mono | Di | Poly |
|---|---|---|---|---|---|---|---|---|---|---|---|
| 22 | 540 | 600 | 3.6 | 61 | 35 | 11.6 | 2.9 | 0.8362 | 30.1 | 2.1 | 2.1 |
| 23 | 580 | 600 | 3.6 | 66 | 36 | 2.2 | 2.8 | 0.8351 | 28.9 | 2.9 | 3.0 |
| 24 | 580 | 600 | 3.6 | 53 | 24 | 3.6 | 3.0 | 0.8365 | 28.9 | 3.1 | 3.3 |
| 25 | 650 | 600 | 3.6 | 70 | −22 | 0.9 | 2.9 | 0.8364 | 28.8 | 5.9 | 6.4 |
| 26 | 540 | 600 | 2 | 58 | 33 | 7.8 | 2.9 | 0.8367 | 28.9 | 3.0 | 3.2 |
| 27 | 580 | 600 | 2 | 64 | 34 | 2.2 | 2.8 | 0.8356 | 28.0 | 3.6 | 3.9 |
| 28 | 580 | 600 | 8 | 49 | 17 | 7.2 | 3.3 | 0.8369 | 28.5 | 3.9 | 4.0 |
| 29 | 650 | 600 | 8 | 56 | −57 | 1.8 | 3.0 | 0.8369 | 28.5 | 6.1 | 6.5 |
| 30 | 540 | 600 | 3.6 | 61 | 35 | 10.0 | 2.7 | 0.8351 | 30.1 | 2.9 | 3.0 |
| 31 | 580 | 600 | 3.6 | 66 | 34 | 3.1 | 2.7 | 0.8364 | 29.4 | 3.2 | 3.3 |
| 32 | 580 | 600 | 3.6 | 40 | 12 | 3.6 | 3.6 | 0.8357 | 28.7 | 3.9 | 4.1 |
| 33 | 540 | 600 | 3.6 | 37 | 18 | 8.7 | 3.5 | 0.8364 | 28.8 | 3.1 | 3.3 |
| 34 | 600 | 600 | 3.6 | 63 | 26 | 2.3 | 2.9 | 0.8352 | 29.2 | 3.4 | 3.6 |
| 35 | 620 | 600 | 3.6 | 68 | 19 | 1.5 | 3.1 | 0.8352 | 28.4 | 4.1 | 4.3 |
| 36 | 540 | 500 | 3.6 | 46 | 23 | 10.4 | 3.1 | 0.8356 | 29.9 | 3.4 | 3.5 |
| 37 | 580 | 500 | 3.6 | 50 | 18 | 4.7 | 3.5 | 0.8364 | 28.8 | 3.1 | 3.3 |
| 38 | 580 | 500 | 3.6 | 30 | 8 | 4.7 | 3.6 | 0.8360 | 28.5 | 4.4 | 4.6 |
| 39 | 580 | 350 | 3.6 | 32 | 2 | 5.7 | 3.6 | 0.8360 | 28.5 | 4.8 | 5.1 |
| 40 | 580 | 350 | 2 | 32 | −14 | 3.3 | 3.4 | 0.8362 | 28.4 | 4.4 | 4.7 |
| 41 | 580 | 600 | 3.6 | 66 | 35 | 4.0 | 3.3 | 0.8353 | 29.2 | 2.9 | 3.1 |
| 42 | 580 | 600 | 12.0 | 50 | 21 | 13.7 | 3.1 | 0.8356 | 29.7 | 2.9 | 3.1 |
| 43 | 580 | 600 | 16.0 | 49 | 19 | 19.3 | 3.6 | 0.8356 | 29.7 | 3.1 | 3.3 |
| 44 | 540 | 600 | 3.6 | 61 | 35 | 11.6 | 2.9 | 0.8362 | 30.1 | 2.1 | 2.1 |
| 45 | 580 | 600 | 3.6 | 66 | 36 | 2.2 | 2.8 | 0.8351 | 28.9 | 2.9 | 3.0 |
| 46 | 580 | 600 | 2 | 64 | 34 | 2.2 | 2.8 | 0.8356 | 28.0 | 3.6 | 3.9 |
| 47 | 580 | 600 | 8 | 49 | 17 | 7.2 | 3.3 | 0.8369 | 28.5 | 3.9 | 4.0 |

TABLE 4-continued

Properties of Contaminated Diesel Used in Examples 22-47

| | | |
|---|---|---|
| | 50 | 236 |
| | 70 | 264 |
| | 80 | 282 |
| | 90 | 307 |
| | 95 | 328 |
| FBP = Final boiling point | FBP | 346 |

The reactors contained a hydrotreating catalyst comprising CoMo on γ-Al$_2$O$_3$ support. It was in the form of extrudates of a quadralobe about 1.3 mm diameter and 10 mm long. About 22.5 ml and 67.5 ml of catalyst were loaded in the first and second reactors, respectively. Reactor 1 was packed with layers of 31 ml (bottom) and 31 ml (top) of glass beads; Reactor 2 was packed with a layer of 8 ml (bottom) and 9 ml (top) of glass beads.

Examples 42 and 43 were conducted using only Reactor 1. Other Examples were conducted using Reactor 1 and Reactor 2 in series.

Hydrogen was fed from compressed gas cylinders and the flow rates were measured using mass flow controllers. The hydrogen was injected and mixed with the fresh diesel feed before Reactor 1. There was no recycle stream or diluent in Examples 22-47. After the catalysts were pre-sulfided and Examples 48-49

A contaminated diesel was mixed with a kerosene from a commercial refiner to provide a diesel feed sample which comprises 70 wt % of the contaminated diesel and 30 wt % of the kerosene. The properties of the resulting diesel feed used in Examples 48-49 are shown in Table 6. The diesel feed was hydrotreated in an experimental pilot unit containing two fixed bed reactors in series.

TABLE 6

Properties of Diesel Feed Used in Examples 48-49

| Property | Unit | Value |
|---|---|---|
| Sulfur | wppm | 1060 |
| Nitrogen | wppm | 10 |
| Density at 15.6° C. | g/ml | 0.8186 |
| API Gravity | | 41.2 |
| Monoaromatic Compounds | wt % | 24.5 |
| Diaromatic Compounds | wt % | 3.2 |
| Polyaromatic Compounds | wt % | 3.3 |
| Cetane Index | | 47.0 |

The reactors contained a hydrotreating catalyst comprising CoMo on γ-Al$_2$O$_3$ support. It was in the form of extrudates of a quadralobe about 1.3 mm diameter and 10 mm long. About 22.5 ml and 67.5 ml of catalyst were loaded in the first and second reactors, respectively. Reactor 1 was packed with layers of 31 ml (bottom) and 31 ml (top) of glass beads; Reactor 2 was packed with a layer of 8 ml (bottom) and 9 ml (top) of glass beads.

Hydrogen was fed from compressed gas cylinders and the flow rates were measured using mass flow controllers. The hydrogen was injected and mixed with the fresh diesel feed before Reactor 1. There was no recycle stream or diluent in Examples 48-49. After the catalysts were pre-sulfided and stabilized, the feed/hydrogen mixture flowed downwardly through a first temperature-controlled sand bath in a 6 mm OD tubing and then in an up-flow mode through Reactor 1. After exiting Reactor 1, additional hydrogen was injected in the effluent of Reactor 1 (feed to Reactor 2). The feed to Reactor 2 flowed downwardly through a second temperature-controlled sand bath in a 6 mm OD tubing and then in an up-flow mode through Reactor 2.

Reaction conditions and the properties of the diesel product are shown in Table 7 below. Legends used in Table 7 have the same meanings as ones used in Table 2 above.

TABLE 7

Summary of Examples 48-49

| Ex. No. | WABT | P | LHSV (hr$^{-1}$) | H$_2$ Feed | H$_2$ Cons. | S | N | Density | Mono | Di | Poly |
|---|---|---|---|---|---|---|---|---|---|---|---|
| 48 | 580 | 600 | 3.6 | 70 | 37 | 10.8 | 3.6 | 0.8183 | 25.3 | 2.9 | 3.0 |
| 49 | 580 | 600 | 2.0 | 58 | 35 | 7.1 | 3.1 | 0.8171 | 24.2 | 2.8 | 2.9 |

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification is to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination.

What is claimed is:

1. A process for producing diesel with reduced levels of sulfur, comprising:
   (a) providing a diesel feed comprising a diesel having a sulfur content in the range of about 20 to about 10,000 wppm;
   (b) feeding the diesel feed and a hydrogen rich gas to a reaction zone comprising a hydrotreating catalyst to produce a hydrotreated diesel effluent comprising diesel and hydrogen sulfide; and
   (c) removing hydrogen sulfide from the hydrotreated diesel effluent to produce a diesel product having a sulfur content no more than about 20 wppm;
   wherein hydrogen consumption in the reaction zone is in the range of about −50 to about 50 scf/bbl, and wherein the reaction zone is a three-phase reaction zone.

2. The process of claim 1, wherein the reaction zone has a temperature from about 260° C. to about 382° C. and a pressure from about 100 to about 1300 psig.

3. The process of claim 1, wherein the diesel product has a sulfur content no more than about 10 wppm.

4. The process of claim 1, wherein the hydrogen consumption in the reaction zone is in the range of about 5 to about 50 scf/bbl.

5. The process of claim 1, wherein naphtha yield is no more than about 2 wt %, and yield of the diesel product is at least about 95 wt %.

6. The process of claim 1, wherein the diesel feed has a sulfur content in the range of about 50 to about 2,000 wppm.

7. A liquid-full process for producing diesel with reduced levels of sulfur, comprising:
   (a) providing a diesel feed comprising a diesel having a sulfur content in the range of about 20 to about 10,000 wppm;
   (b) contacting the diesel feed with (i) a diluent and (ii) a hydrogen rich gas to form a feed/diluent/hydrogen mixture, wherein the hydrogen is dissolved in the mixture to provide a liquid feed;
   (c) contacting the feed/diluent/hydrogen mixture with a hydrotreating catalyst in a liquid-full reaction zone to produce a hydrotreated diesel effluent comprising diesel and hydrogen sulfide;
   (d) optionally recycling a portion of the hydrotreated diesel effluent as a hydrocarbon recycle stream for use as all or part of the diluent in step (b)(i) at a recycle ratio of no more than about 10; and
   (e) removing hydrogen sulfide from at least a portion of the hydrotreated diesel effluent not recycled to produce a diesel product having a sulfur content no more than about 20 wppm;
   wherein hydrogen consumption in the reaction zone is in the range of about −50 to about 50 scf/bbl.

8. The liquid-full process of claim 7, wherein the at least a portion of the hydrotreated diesel effluent not recycled is further hydrotreated prior to the hydrogen sulfide removal step (e).

9. The liquid-full process of claim 7, wherein a portion of the hydrotreated diesel effluent is recycled as a hydrocarbon recycle stream for use as all or part of the diluent in step (b)(i) at a recycle ratio of no more than about 10.

10. The liquid-full process of claim 9, wherein the recycle ratio is from about 0.1 to about 5.

11. The liquid-full process of claim 9, wherein the diluent consists essentially of the hydrocarbon recycle stream.

12. The liquid-full process of claim 7, wherein the hydrotreating catalyst comprises a non-precious metal and an oxide support.

13. The liquid-full process of claim 7, wherein the diesel product has a sulfur content no more than about 10 wppm.

14. The liquid-full process of claim 7, wherein the hydrogen consumption in the reaction zone is in the range of about 5 to about 50 scf/bbl.

15. The process of claim 7, wherein the diesel feed has a sulfur content in the range of about 50 to about 2,000 wppm.

16. A liquid-full process for producing diesel with reduced levels of sulfur, comprising:
   (a) providing a diesel feed comprising a diesel having a sulfur content in the range of about 20 to about 10,000 wppm;
   (b) contacting the diesel feed with a hydrogen rich gas to form a feed/hydrogen mixture, wherein the hydrogen is dissolved in the mixture to provide a liquid feed, and the mixture is not diluted with a diluent;
   (c) contacting the feed/hydrogen mixture with a hydrotreating catalyst in a liquid-full reaction zone to produce a hydrotreated diesel effluent comprising diesel and hydrogen sulfide; and
   (d) removing hydrogen sulfide from the hydrotreated diesel effluent to produce a diesel product having a sulfur content no more than about 20 wppm;
wherein hydrogen consumption in the reaction zone is in the range of about −50 to about 50 scf/bbl, and no hydrotreated diesel effluent is recycled as a recycle stream.

17. The liquid-full process of claim 16, wherein the hydrotreating catalyst comprises a non-precious metal and an oxide support.

18. The liquid-full process of claim 16, wherein the diesel product has a sulfur content no more than about 10 wppm.

19. The liquid-full process of claim 16, wherein the hydrogen consumption in the reaction zone is in the range of about 5 to about 50 scf/bbl.

20. The liquid-full process of claim 16, wherein the liquid-full reaction zone has a temperature from about 260° C. to about 382° C. and a pressure from about 100 to about 1300 psig.

21. The liquid-full process of claim 16, wherein naphtha yield is no more than about 5 wt %.

22. The process of claim 16, wherein the diesel feed has a sulfur content in the range of about 50 to about 2,000 wppm.

* * * * *